US008143832B2

(12) United States Patent
Holzmann et al.

(10) Patent No.: US 8,143,832 B2
(45) Date of Patent: Mar. 27, 2012

(54) METHOD AND UNIT FOR OPERATING AN ELECTROMECHANICAL ADJUSTING DEVICE

(75) Inventors: Stefan Holzmann, Gaweinstal (AT); Roman Morawek, Vienna (AT); Daniel Zuffer, Hörersdorf (AT)

(73) Assignee: Continental Automotive GmbH, Hannover (DE)

( * ) Notice: Subject to any disclaimer, the term of this patent is extended or adjusted under 35 U.S.C. 154(b) by 332 days.

(21) Appl. No.: 12/598,987

(22) PCT Filed: Apr. 25, 2008

(86) PCT No.: PCT/EP2008/055044

§ 371 (c)(1),
(2), (4) Date: Nov. 5, 2009

(87) PCT Pub. No.: WO2008/135407

PCT Pub. Date: Nov. 13, 2008

(65) Prior Publication Data

US 2010/0138046 A1 Jun. 3, 2010

(30) Foreign Application Priority Data

May 7, 2007 (DE) ........................ 10 2007 021 285

(51) Int. Cl.
*H02P 3/00* (2006.01)
*H02P 7/20* (2006.01)

(52) U.S. Cl. ........ 318/466; 318/266; 318/286; 318/445; 318/468; 49/349; 49/350

(58) Field of Classification Search .................. 318/266, 318/265, 280, 286, 434, 444, 445, 466, 458; 49/349, 350
See application file for complete search history.

(56) References Cited

U.S. PATENT DOCUMENTS

| | | | | |
|---|---|---|---|---|
| 4,908,988 | A * | 3/1990 | Yamamura et al. | 49/358 |
| 5,278,480 | A | 1/1994 | Murray | 318/626 |
| 5,399,950 | A * | 3/1995 | Lu et al. | 318/565 |
| 5,404,673 | A * | 4/1995 | Takeda et al. | 49/28 |

(Continued)

FOREIGN PATENT DOCUMENTS

DE 19536207 4/1996

(Continued)

OTHER PUBLICATIONS

German Office Action for Application No. 10 2007 021 285.4 (3 pages), Jan. 9, 2008.

(Continued)

*Primary Examiner* — Paul Ip
(74) *Attorney, Agent, or Firm* — King & Spalding L.L.P.

(57) ABSTRACT

In a method for operating an electromechanical adjusting device, having an actuating part driven by a controller controlled motor, and which can be adjusted according to a manual specification for a controller operating element between a first and a second end position, the controller detects the precise position of a blockage of an adjusting movement from fed sensor signals, wherein user action performed on the operating element adjusts the actuating part by a first movement directed toward the end position to a position at which mechanical blockage occurs in order to determine a reference position, and adjusts the actuating part by a second movement into the second end position to examine the validity of the previously determined reference position by a test program which decides whether an automatic operating mode, in which an actuating process runs automatically, is activated, or blocked, as a function of the test result.

19 Claims, 1 Drawing Sheet

U.S. PATENT DOCUMENTS

| | | | | |
|---|---|---|---|---|
| 5,410,226 | A * | 4/1995 | Sekiguchi et al. | 318/266 |
| 5,436,539 | A | 7/1995 | Wrenbeck et al. | 318/265 |
| 5,539,290 | A * | 7/1996 | Lu et al. | 318/565 |
| 5,682,090 | A * | 10/1997 | Shigematsu et al. | 318/468 |
| 5,872,436 | A * | 2/1999 | Bergmann et al. | 318/286 |
| 6,756,755 | B2 | 6/2004 | Kusunoki | 318/285 |
| 7,250,736 | B2 * | 7/2007 | Hirai | 318/266 |
| 7,307,395 | B2 * | 12/2007 | Bouamra et al. | 318/445 |
| 7,482,774 | B2 * | 1/2009 | Gregori | 318/466 |
| 7,770,327 | B2 * | 8/2010 | Noro et al. | 49/349 |
| 2004/0130285 | A1 * | 7/2004 | Le Gallo | 318/466 |
| 2005/0251314 | A1 | 11/2005 | Schindler et al. | 701/49 |
| 2006/0254148 | A1 * | 11/2006 | Noro et al. | 49/352 |
| 2007/0119100 | A1 * | 5/2007 | Nakada et al. | 49/350 |
| 2009/0058340 | A1 * | 3/2009 | Sakai et al. | 318/434 |

FOREIGN PATENT DOCUMENTS

| | | |
|---|---|---|
| DE | 202004007158 | 7/2005 |
| DE | 102004007158 | 8/2005 |
| DE | 102005006295 | 12/2005 |
| EP | 0640740 | 3/1995 |
| EP | 1293635 | 3/2003 |

OTHER PUBLICATIONS

International Search Report and Written Opinion for Application No. PCT/EP2008/055044 (12 pages), Aug. 29, 2008.

* cited by examiner

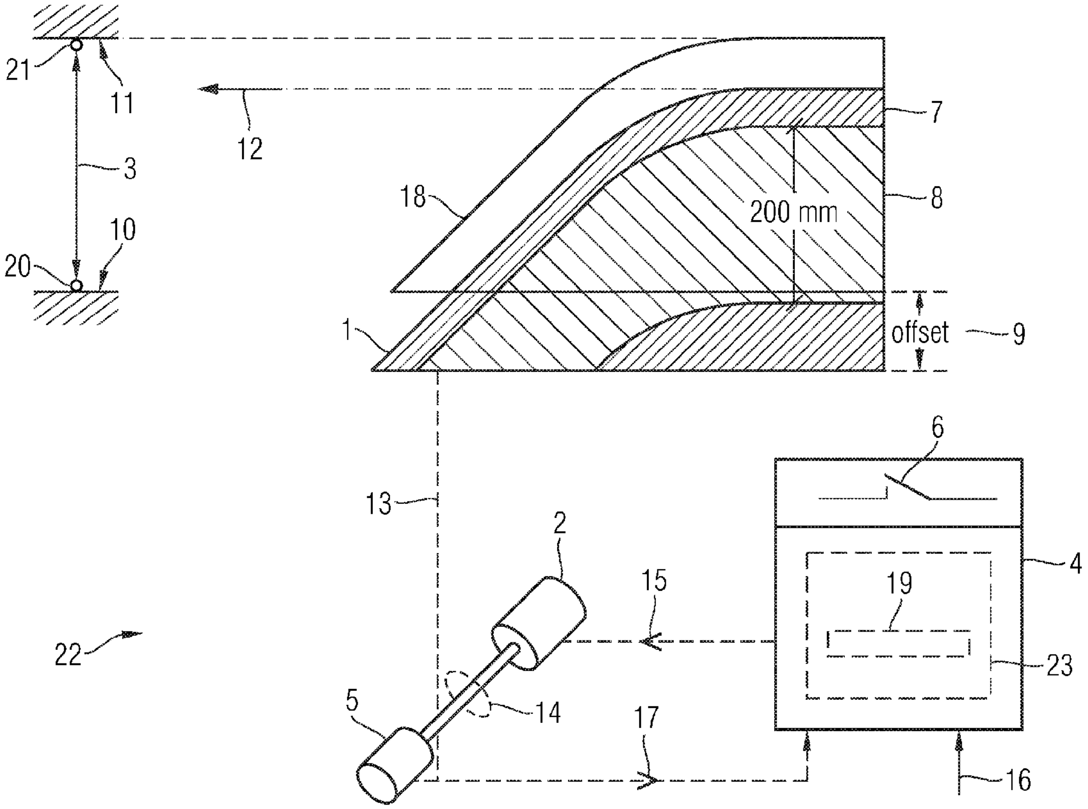
21
11
12
7
3
18
8
200 mm
10
20
offset
9
1
6
13
2
4
15
19
22
23
5
14
17
16

METHOD AND UNIT FOR OPERATING AN ELECTROMECHANICAL ADJUSTING DEVICE

CROSS-REFERENCE TO RELATED APPLICATIONS

This application is a U.S. National Stage Application of International Application No. PCT/EP2008/055044 filed Apr. 25, 2008, which designates the United States of America, and claims priority to German Application No. 10 2007 021 285.4 filed May 7, 2007, the contents of which are hereby incorporated by reference in their entirety.

TECHNICAL FIELD

The invention relates to a method for the operation of an electromechanical adjusting device, with an actuating part, which is driven by a motor, which is controlled by a controller, and which can be adjusted between a first end position and a second end position depending on a manual specification for an operating element of the controller, the controller being configured to detect the precise position of a blockage of an adjusting movement from sensor signals fed from a sensor means.

BACKGROUND

It is known that in motor vehicles, electromechanical adjusting drives are employed to adjust window panes, sliding roofs or other actuating parts, for which anti-trap protection can be legally prescribed on safety grounds. This anti-trap protection prevents bodily injury being incurred as a result of impermissibly high pinching forces in the case of manually triggered, but autonomously running closure.

The anti-trap protection can, however, only be effective if the position of the actuating part assumed by the controller tallies with the actual position. In order to ensure this is the case, an initialization of the adjusting drive is required, which can first be performed during manufacture of the drive but also during operation, and during which a reference position is determined. In the case of an automobile window lifter, the window pane is generally moved upwards, against a rubber seal in the door frame. The blockage position in the closed position of the pane is regarded as a reference point ("absolute zero") for all subsequent adjusting movements of the window pane.

Errors may, however, occur during initialization. If during the initialization run, the window pane or the sliding roof are inadvertently blocked, for example by an obstacle in the adjustment path, or a mechanical stiffness arises in the transmission system, or a temporary fault occurs with the metrological recording of the blockage status, then the defined reference position is incorrect, that is to say it does not tally with the actual end position. Such a fault could be detected during the manufacturing process in the course of quality assurance, for example by means of a visual check as to whether the window pane is actually in an open or closed position. If this is not the case, the initialization must be performed afresh. This is associated with a corresponding degree of effort. If, however, this fault occurs during operation in the case of proper usage, the customer must seek a specialist workshop, with the associated effort.

If an initialization fault of this kind remains undetected, this has the further consequence that all adjusting movements subsequent to the initialization phase are based on a false reference point. This also has the consequence that in the case of a window lifter, the anti-trap protection no longer acts in safety-critical proximity to the door frame, but is shifted to an area at some distance from this. However in the case of the automatically running closure of the window pane, the closing force is thus no longer limited in the legally prescribed region of the adjustment path. Bodily injuries may be suffered as a result.

SUMMARY

According to various embodiments, a method and a device for the operation of an electromechanical adjusting device can be specified such that the effectiveness of an anti-trap protection is not impaired by an incorrectly assimilated reference position.

According to an embodiment, a method for the operation of an electromechanical adjusting device, with an actuating part, which is driven by a motor, which is controlled by a controller, and which can be adjusted between a first end position and a second end position depending on a manual specification for an operating element of the controller, wherein the controller is configured to detect the precise position of a blockage of an adjusting movement from sensor signals fed from a sensor means, may comprise the step of performing a user action at the operating element, wherein the actuating part is adjusted by an adjusting movement in the direction of the first end position, to take up a position in which a mechanical blockage occurs, in order to determine a reference position, and the actuating part is adjusted by a second adjusting movement into the second end position, in order to check the validity of the previously determined reference position by means of a test program held in readiness in the controller, wherein the test program decides, depending on the test result, whether an automatic operating mode, in which an actuating process initiated at the operating element runs automatically, is enabled or blocked.

According to a further embodiment, during this second adjusting movement the test program may compare current position information of the actuating part with adjustment path information stored in a storage device. According to a further embodiment, after attainment of the second end position depending on the test result it may be decided whether the previously detected reference position is to be retained or rejected. According to a further embodiment, a position sensor may be used as the sensor means and the position signals of this position sensor are used for detection of a mechanical blockage. According to a further embodiment, a single Hall sensor can be used as the position sensor, which detects the magnetic field of a sensor wheel mechanically connected to the motor shaft. According to a further embodiment, the reference position can be stored in a memory cell of the storage device together with supplementary information indicating validity. According to a further embodiment, the test program can be formed by program code executable on a microcontroller. According to a further embodiment, the validity of the position can be checked both upon the first initialization during manufacture as well in post-initialization during operation of the adjusting device, wherein the post-initialization is either performed regularly or in the event of a fault.

BRIEF DESCRIPTION OF THE DRAWINGS

For further explanation of the invention the following part of the description refers to the drawings, from which further advantageous embodiments, details and developments of the invention are to be derived.

Wherein:

FIG. 1 shows a schematic representation of an electromechanical adjusting device on the basis of which the invention is explained.

DETAILED DESCRIPTION

According to various embodiments, not only a reference position is defined, but also its validity is checked. In other words, not only is a reference position learned, but what is learned is also checked for correctness, or, in a word, validated. Only on the basis of this test result is it decided whether automatic closing is to be permitted. The risk of injury accompanying an incorrectly assimilated reference position is eliminated.

In an embodiment, this check takes place on the basis of a manually controlled adjustment procedure, which moves the pane into an end position, the open position of a vehicle window. Attainment of the open position is detected by the blockage detection facility in the controller. If—working from the previously defined reference position—the entire adjustment path (the stretch between the end positions) can be adjusted without blockage, the controller regards the previously defined reference position as being correct. As no discrepancy between the position assumed by the controller and the actual position of the closing unit has been detected, it is assumed that the anti-trap protection is operating within the legally prescribed section of the adjustment path and not in a different area. In the case of autonomously running closure, there is thus no impairment of the safety function. The controller enables the automatic operation. If, however, during this second actuating process a blockage occurs within the maximum adjustment path (the controller detects, when analyzing the position signal, that the pane cannot be adjusted downwards through its full stroke, but has encountered a mechanical stop), then the previously learned reference position was false, that is it did not tally with the actual closed position. The controller recognizes the danger accompanying this shift in position, namely that in this case the effective area of the anti-trap protection has shifted. With autonomously running closure the legally required safety function would thus not be provided. Consequently the controller does not enable the automatic operation in this case. The automatic operation remains blocked until the reference position is recognized as valid by the technical system by means of manually initiated closing and opening of the window.

One embodiment can be characterized in that only upon attainment of the second end position is a decision made, depending on the test result, as to whether the reference position previously recorded is retained or rejected.

Validity is also thereby correctly determined in a mechanical peripheral area, and secure closure guaranteed.

The various embodiments can be realized cost-effectively if already existing hardware can be used, that is, for example, if conventional position sensors are used as sensor means and to recognize a mechanical blockage, and the same position signals of this position sensor are employed for position detection purposes.

It is here particularly favorable if a single Hall sensor is used, which detects the magnetic field of a sensor wheel mechanically coupled to the motor shaft.

From the programming technology perspective, it can be expedient if the reference value is stored in a memory cell of the storage device, together with supplementary information indicating validity.

The test program can be realized in a simple manner as an algorithm on a microcontroller. It can be particularly advantageous if the validity of the position can be checked both upon the first-time initialization in the manufacturing facility and during post-initialization during the ongoing operation of an automobile. Depending on the particular application it can be of particular advantage if the post-initialization is performed either at regular intervals, or whenever an initialization loss is detected in the event of a malfunction.

FIG. 1 shows a schematic representation of an external force actuated window lifter, as is nowadays customarily employed in motor vehicles. The method according to various embodiments for the operation of this adjusting device is explained below in greater detail on the basis of this representation:

The electromechanical adjusting device is indicated as a whole in FIG. 1 with the reference number 22. It essentially comprises an actuating part 1, here an automobile window pane 1, which can be adjusted within an adjustment path 3 (stroke) by means of the drive power of a motor 2. The motor 2 is coupled to the window pane 1 via gears 14 and a pulley 13. The motor 2 is connected to a controller 4, specifically a microcontroller, with a control line 15. For monitoring of the adjustment process a position sensor 5 is coupled to the drive train, the sensor signals from which are fed to the controller 4 via a line 17. The controller 4 comprises the microcontroller 23 with a storage device 19 and is connected to a power supply 16. The program in the microcontroller is configured, among other things, to detect a blockage upon adjustment of the window 1 by analyzing the sensor signals, and contains the test program, which is explained in greater detail below.

In order to initiate an adjustment process, an operating element 6 is provided at the controller 4. This operating element can be a simple touch switch. In the case of full functionality of the adjusting device 22, an adjustment process can in the known manner proceed either manually or automatically: in the manual operating mode the window pane is moved for as long as the operating element 6 is manually actuated; in the automatic operating mode, the adjusting movement proceeds autonomously, as soon as a predefined actuating interval of the operating element 6 is exceeded.

As indicated at the top left in the drawing in FIG. 1, the window pane 1 can be adjusted along the adjustment path 3; the maximum possible stroke of the adjusting movement is defined by a first (upper) end position 21 and a second (lower) end position 20. The first end position 21 is delimited by a mechanical stop 11, the second end position 20 by a mechanical stop 10. In normal operation, the lower stop 10 is not run up against. The current position of the window pane between these two end positions 20 and 21 outlined in FIG. 1 is indicated by a pointer 12, which corresponds to the upper edge of the pane 1. The maximum adjustment path 3 is stored in the memory 19 of the microcontroller 23.

In the open position 20, the opening in the window frame 18 is fully revealed by the window pane 1 (pointer 12 indicates 20). In the closed position (pointer 12 indicates 21) the opening in the window frame 18 is completely closed by the window pane 1.

As already set down at the outset, in the case of a motor-driven window lifter in an automobile an anti-trap detection system is provided on safety grounds, which limits the excess force upon closure within a predefinable area, so that injuries caused by trapping parts of the body are prevented. (In FIG. 1 the area 8, in which the excess force is limited (typically around 20 cm) is identified by reference number 8 and the inactive area (ingress into the rubber seal) by reference number 7.)

A prerequisite for proper limitation of the excess force is knowledge of the actual position of the window pane relative to the window frame 18. That is to say that both during manufacture and also from time to time during operation, an initialization of the system must be performed, in which the absolute zero position of the adjusting movement is learned and, if appropriate, corrected.

If this initialization is faulty, as already mentioned a position offset arises between the position assumed by the controller (4) and the actual position of the window pane 1, indicated as "Offset" in FIG. 1 with the reference number 9. As a result of this offset, however, the safety of the anti-trap protection is no longer guaranteed in the case of automatic closure.

This is where the invention proves its worth, in that not only is a reference position determined, but certainty provided as to whether it is actually valid, before a safety-critical automatic operating mode for closure of the window 1 is enabled.

This position validation is explained in greater detail below:

To this end a reference position must initially be present for testing. It is assumed here that this has previously been determined in a manner known per se, for example by the window pane 1 being moved in the direction of the closed position (end position 21) in a first step by means of manual actuation of the touch switch 6, a blockage of the motor being recognized by the blockage detection facility of the controller 4, and this blockage position defined as the reference position.

In a second step according to various embodiments a check as to whether this previously determined reference position is actually valid is performed. This takes place by means of the test run according to various embodiments. Here, the window pane 1 is fully opened. In the case of a window lifter, this opening is effected in a sensible manner by means of a manual user action on the touch switch 6, but could also take place automatically. During this opening movement, the blockage detection facility is one again active, and observes whether a mechanical blockage occurs. If at the end of the opening movement it is determined that no mechanical blockage has occurred, the validity of the previously determined reference position holds good. The previously defined reference position corresponds to the actual circumstances (that is to say the upper stop 11 was actually run up against in the first step and this position—in accordance with actuality—correctly regarded as the zero point of motion by the controller).

If however a blockage of the motor (stop 10) was detected upon opening, then the reference position initialized in the first step was incorrect (that is, for example an obstruction was jammed between door frame 18 and upper edge of the window pane 1 and this blockage status was erroneously regarded by the controller 4 as the stop 11 having been reached). In this case the "offset" 9 identified in FIG. 1 is present. Here the validity of the reference position is not established; the controller 4 does not enable the automatic operating mode for closure. Neither can any impairment of the safety function of the adjusting device occur, as a safety-critical, autonomously running closure at the operating element 6 cannot be triggered.

The full functionality of the window lifter, that is manual and automatic operating mode, is only then (again) available, if the user initially performs complete closure and subsequently complete opening of the window pane at the operating element 6 by means of manual operation, and it was possible to validate the reference position determined in the closed position by the test program after completion of the opening movement.

The result of the position validation is to ensure that the reference position as determined tallies with the reality. Autonomous closure is only possible after successful validation of the reference position.

The embodiment of the invention represented here is of course also possible, mutatis mutandis, in the reverse direction. Thus, for example, the reference position can also be first initialized at the lower end position 20, and validated with complete closure of the window 1. This is however unusual, as the precision of the upper stop 11 (rubber seal) in the case of a window lifter is more important (test bar 4 mm).

The invention is of course not limited to automobile-based adjusting devices for window panes or sliding roofs, but can also be employed in other safety-critical adjusting devices.

What is claimed is:

1. A method for the operation of an electromechanical adjusting device with an actuating part, which is driven by a motor, which is controlled by a controller, and which can be adjusted between a first end position and a second end position depending on a manual specification for an operating element of the controller, wherein the controller is configured to detect the precise position of a blockage of an adjusting movement from sensor signals fed from a sensor means, the method comprising the step of performing a user action at the operating element, wherein:

the actuating part is adjusted by an adjusting movement in the direction of the first end position, to take up a position in which a mechanical blockage occurs, in order to determine a reference position, and the actuating part is adjusted by a second adjusting movement into the second end position, in order to check the validity of the previously determined reference position by means of a test program held in readiness in the controller, wherein the test program decides, depending on the test result, whether an automatic operating mode, in which an actuating process initiated at the operating element runs automatically, is enabled or blocked.

2. The method according to claim 1, wherein during this second adjusting movement the test program compares current position information of the actuating part with adjustment path information stored in a storage device.

3. The method according to claim 2, wherein after attainment of the second end position depending on the test result it is decided whether the previously detected reference position is to be retained or rejected.

4. The method according to claim 2, wherein a position sensor is used as the sensor means and the position signals of this position sensor are used for detection of a mechanical blockage.

5. The method according to claim 1, wherein a single Hall sensor is used as the position sensor, which detects the magnetic field of a sensor wheel mechanically connected to the motor shaft.

6. The method according to claim 1, wherein the reference position is stored in a memory cell of the storage device together with supplementary information indicating validity.

7. The method according to claim 1, wherein the test program is formed by program code executable on a microcontroller.

8. The method according to claim 1, wherein the validity of the position is checked both upon the first initialization during manufacture as well in post-initialization during operation of the adjusting device, wherein the post-initialization is either performed regularly or in the event of a fault.

9. A device for performing the method as claimed in claim 1, wherein the controller is configured to perform a test run, by means of which the validity of a previously detected reference position can be checked, and that depending on the test result, an automatic operating mode of the adjusting device, in which an autonomously running movement of the actuating part into a closed position triggered by an operating element of the controller is enabled or blocked.

10. The device according to claim 9, wherein the controller contains a microcontroller, and that the test run is prescribed in the form of an algorithm, which is executable on the microcontroller.

11. The device according to claim 9, wherein position signals of a position sensor, which is formed by a single Hall sensor are fed to the controller.

12. A system for the operation of an electromechanical adjusting device comprising an actuating part, which is driven by a motor, which is controlled by a controller, and which can be adjusted between a first end position and a second end position depending on a manual specification for an operating element of the controller, wherein the controller is configured to detect the precise position of a blockage of an adjusting movement from sensor signals fed from a sensor means, the system through a user action at the operating element being operable to:

adjust the actuating part by an adjusting movement in the direction of the first end position, to take up a position in which a mechanical blockage occurs, in order to determine a reference position, and to adjust the actuating part by a second adjusting movement into the second end position, in order to check the validity of the previously determined reference position by means of a test program held in readiness in the controller, wherein the test program decides, depending on the test result, whether an automatic operating mode, in which an actuating process initiated at the operating element runs automatically, is enabled or blocked.

13. The system according to claim 12, wherein during this second adjusting movement the test program compares current position information of the actuating part with adjustment path information stored in a storage device.

14. The system according to claim 13, wherein after attainment of the second end position depending on the test result it is decided whether the previously detected reference position is to be retained or rejected.

15. The system according to claim 13, comprising a position sensor as the sensor means and the position signals of this position sensor are used for detection of a mechanical blockage.

16. The system according to claim 12, comprising a single Hall sensor as the position sensor, which detects the magnetic field of a sensor wheel mechanically connected to the motor shaft.

17. The system according to claim 12, wherein the reference position is stored in a memory cell of the storage device together with supplementary information indicating validity.

18. The system according to claim 12, wherein the test program is formed by program code executable on a microcontroller.

19. The system according to claim 12, wherein the validity of the position is checked both upon the first initialization during manufacture as well in post-initialization during operation of the adjusting device, wherein the post-initialization is either performed regularly or in the event of a fault.

* * * * *